United States Patent
Stevens et al.

(10) Patent No.: US 6,563,108 B1
(45) Date of Patent: May 13, 2003

(54) SYSTEM FOR TRACKING ANGULAR AND LINEAR MOTION

(75) Inventors: James Stevens, Barneveld, WI (US); Todd Martin, Dodgeville, WI (US)

(73) Assignee: Quantum Devices, Inc., Barneveld, WI (US)

( * ) Notice: Subject to any disclaimer, the term of this patent is extended or adjusted under 35 U.S.C. 154(b) by 0 days.

(21) Appl. No.: 09/425,803

(22) Filed: Oct. 25, 1999

(51) Int. Cl.[7] .................................................. G01D 5/34
(52) U.S. Cl. ............................ 250/231.13; 250/231.14; 250/231.17
(58) Field of Search ..................... 250/231.13, 231.14, 250/231.16, 231.17; 341/13, 31

(56) References Cited

U.S. PATENT DOCUMENTS

| | | | |
|---|---|---|---|
| 3,757,128 A | 9/1973 | Vermeulen | 250/231 |
| 4,160,200 A | 7/1979 | Imamura et al. | |
| 4,259,570 A * | 3/1981 | Leonard | 250/214 A |
| 4,263,506 A * | 4/1981 | Epstein | 250/231 SE |
| 4,266,125 A * | 5/1981 | Epstein et al. | 250/231 SE |
| 4,451,731 A | 5/1984 | Leonard | 250/237 |
| 4,496,835 A | 1/1985 | Boella et al. | 250/231 |
| 4,650,993 A | 3/1987 | Boella et al. | 250/231 |
| 4,691,101 A | 9/1987 | Leonard | 250/231 |
| 4,904,861 A | 2/1990 | Epstein et al. | 250/214 |
| 4,920,259 A | 4/1990 | Epstein | 250/237.13 |
| 4,998,013 A | 3/1991 | Epstein et al. | 250/214 |
| 5,013,910 A | 5/1991 | Epstein | 250/231.17 |
| 5,101,102 A * | 3/1992 | Nishimura et al. | 250/231.16 |
| 5,539,519 A | 7/1996 | Takagi et al. | |
| 5,889,280 A * | 3/1999 | Matsuura | 250/237 G |

FOREIGN PATENT DOCUMENTS

| | | |
|---|---|---|
| EP | 0143525 A1 | 6/1985 |
| GB | 2288015 A | 10/1995 |

* cited by examiner

*Primary Examiner*—Stephone B. Allen
*Assistant Examiner*—Eric Spears
(74) *Attorney, Agent, or Firm*—Michael Best & Friedrich LLP (57) ABSTRACT

The invention provides a system for sensing angular motion. The system includes a light source, a transducing member, and a modulating member having a track of translucent and opaque regions positioned between the light source and the transducing member. The transducing member includes optical receivers spaced across a width larger than or equal to three translucent and three opaque regions. The optical receivers, which may be interlaced across the transducing member, generate a plurality of output signals that form at least one output channel signal. The system may further include a second track of translucent and opaque regions and a second interlaced transducing member. The second transducing member includes a second plurality of optical receivers arranged to generate a plurality of signals that may be used to generate at least one index signal.

24 Claims, 7 Drawing Sheets

SYSTEM FOR TRACKING ANGULAR AND LINEAR MOTION

BACKGROUND OF THE INVENTION

1. Technical Field of the Invention

The present invention relates to a system for sensing angular and linear motion, and more particularly, to an optical encoder that tracks angular and linear position, velocity, and direction.

2. Description of the Related Art

Many technologies track mechanical motion. Some technologies track motion by sensing light. Photoelectric encoders, for example, employ a light source, a code wheel, and light detectors to track the motion of an object like a shaft by sensing modulated light. The light source emits a beam of light in the direction of the code wheel. The code wheel interrupts the beam of light at a frequency that correlates to the rotation of the shaft. The portion of light passing through the code wheel is detected and then converted into electrical signals by light detectors.

Unfortunately, some photoelectric encoders cannot be adapted to small electromechanical technologies. A miniature motor, for example, may use a code wheel that has densely compact transparent and opaque segments to provide a useful resolution.

A known approach that may be practiced with these technologies is described in U.S. Pat. No. 4,691,101 assigned to Hewlett Packard. This approach uses light detectors positioned immediately adjacent to one another to track angular motion. Unfortunately, close arrangements of light detectors can be susceptible to crosstalk created by the diffusion of light through the code wheel, the internal reflection of light within the encoder itself, or the movement of charged particles (e.g. electrons) from one detector to another. Additional circuitry may thus be needed to compensate for this condition, which adds additional parts and expenses to the device and complicates assembly.

SUMMARY OF THE INVENTION

The invention provides a system for sensing linear and angular motion. The system comprises a light source, a transducing member, and a modulating member having a track of translucent and opaque regions positioned between the light source and the transducing member. The transducing member includes optical receivers spaced across a width greater than or equal to the combined widths of three translucent and three opaque regions. The optical receivers, which can be interlaced across the transducing member, generate a plurality of output signals that may form at least one output channel signal.

The system may further include a second track of translucent and opaque regions and a second transducing member. The second transducing member includes a second plurality of optical receivers, which can be interlaced across the transducing member, to generate a plurality of signals that may be used to generate at least one index signal.

The alignment and design of the transducing members minimize adjacent interference or crosstalk to which a close alignment of light detectors can be otherwise susceptible. Moreover, insignificant mechanical or optical misalignments will not affect the system of the invention because the spaced-apart relationship of the optical receivers has a wide tolerance. In addition, the system uses a small number of parts that simplify assembly. This may be particularly important when used with miniature technologies.

DETAILED DESCRIPTION OF THE INVENTION

In the drawings the same reference numbers through several views designate alike and similar elements.

Optical systems of the type described in this Detailed Description of the Invention have been successfully fabricated utilizing the following principal elements. It should be recognized that the dimensions of these principal elements will vary according to the desired resolution of the invention. Accordingly, the descriptions set forth in Table 1 should not be considered limiting and are provided to illustrate one of the many forms that the invention may take.

TABLE 1

| Modulating Member | | |
|---|---|---|
| Type | glass | |
| Resolution | 1000 | C.P.R. |
| Translucent regions | | |
| Height | 1270 | Microns |
| Width | 15 | Microns |
| Opaque regions | | |
| Height | 1270 | Microns |
| Width | 15 | Microns |
| Light Source | | |
| Type | 880 nm | LED |

TABLE 1-continued

| Optical Receivers | | |
|---|---|---|
| Type | Planar Photo Diode (P on N Construction) | |
| Comparator Circuit | | |
| Type | LM339 | |
| Load resistors | 5K to 15K | Ohms |

Figure 3:
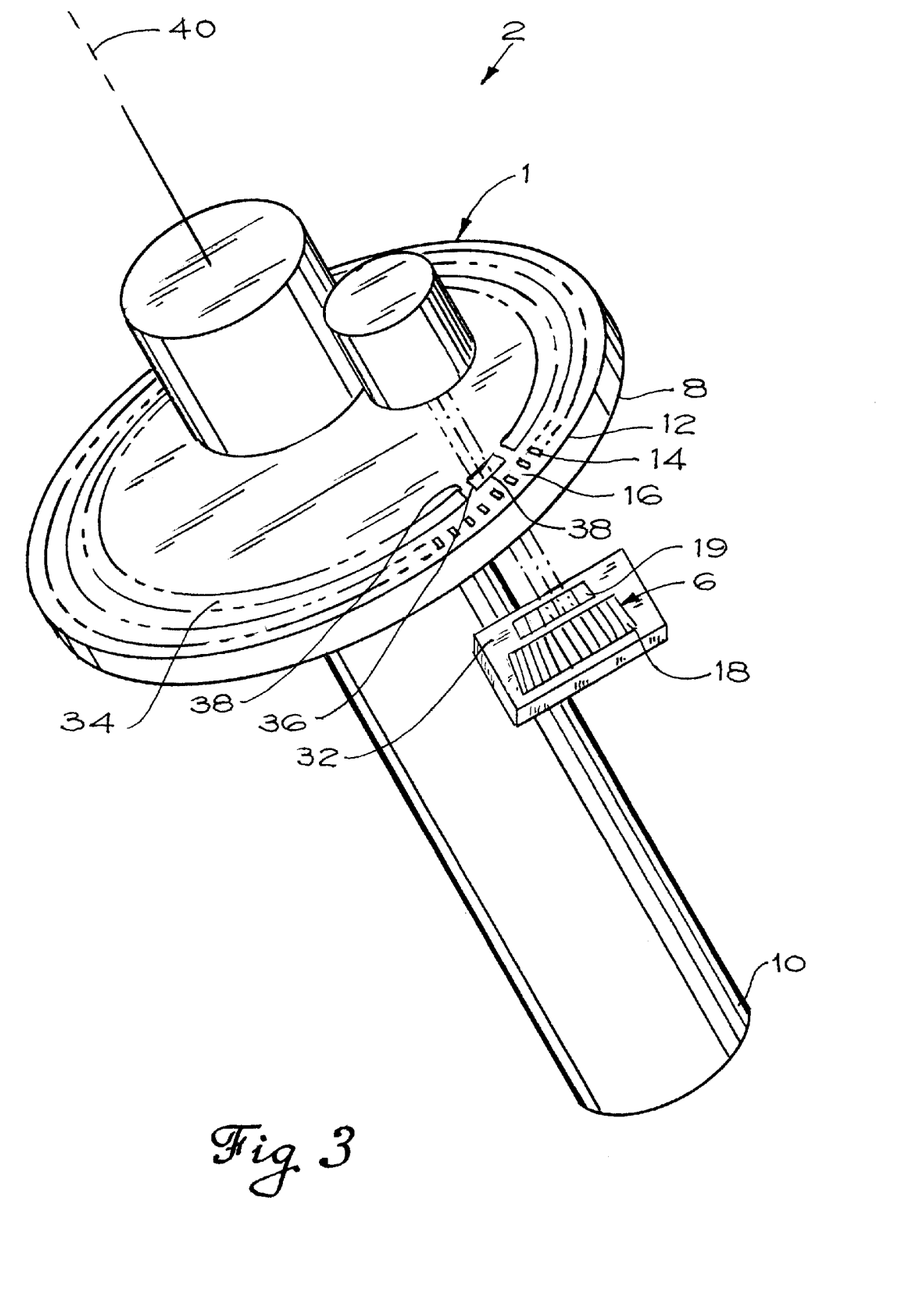
FIG. 3 is a perspective view of the preferred embodiment.

Turning now to the drawings, FIG. 3 shows a perspective view of an optical encoder 2 that incorporates a preferred embodiment of the invention. The optical encoder 2 has a light source 4 a first transducing member 6, and a modulating member 8 mated to a shaft 10.

The light source 4 may comprise one or more devices that convert an applied voltage to light, such as a light emitting diode (LED). The light source 4 can be selected to emit a preferred wavelength of light and may include one or more lenses to amplify and focus light onto one or more optical paths.

The modulating member 8 has a perimeter track 12 comprised of translucent regions 14 and opaque regions 16. The translucent regions 14 shown in FIG. 3 are comprised of a series of openings equally separated from one another by opaque regions 16. The openings have dimensions that allow light to pass to the first transducing member 6 when the light source 4 and a translucent region 14 are at least partially in optical alignment.

Although the translucent 14 and opaque 16 regions of FIG. 3 are arranged along an entire periphery of a code wheel or disc 8, other forms of the invention may employ the translucent 14 and opaque regions 16 in a linear arrangement or use a linear modulating member.

From the accompanying description and drawings, it should be apparent that the modulating member 8 modulates light emitted from the light source 4. In this regard, the modulating member 8 may take other shapes, provided that the shapes vary the incidence of light detected by the first transducing member 6.

Figure 1A:
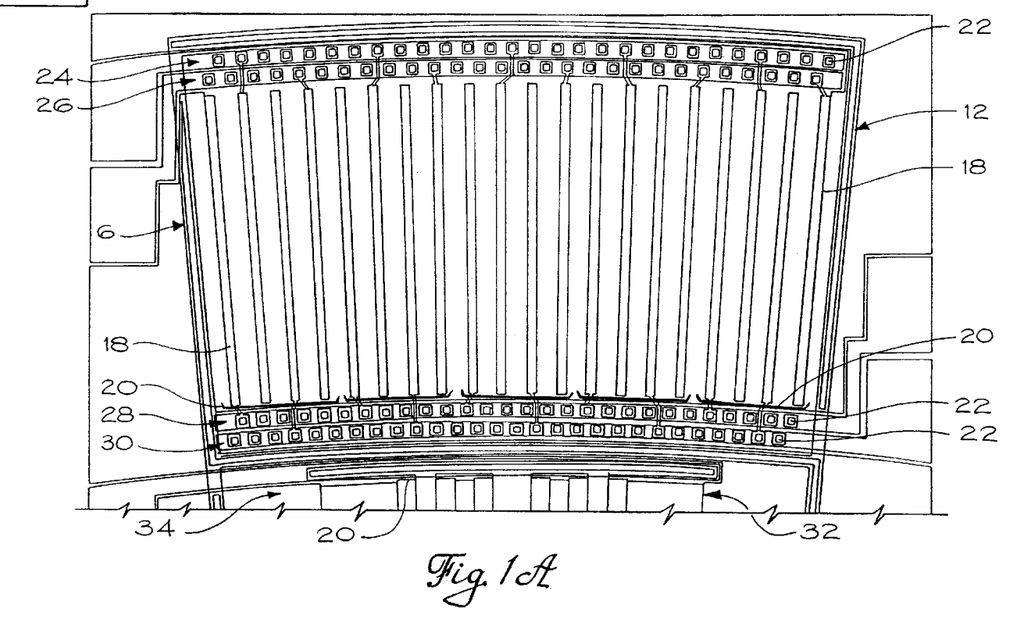
FIG. 1A is a plan view of a first transducing member of a preferred embodiment of the invention.
Figure 1B:
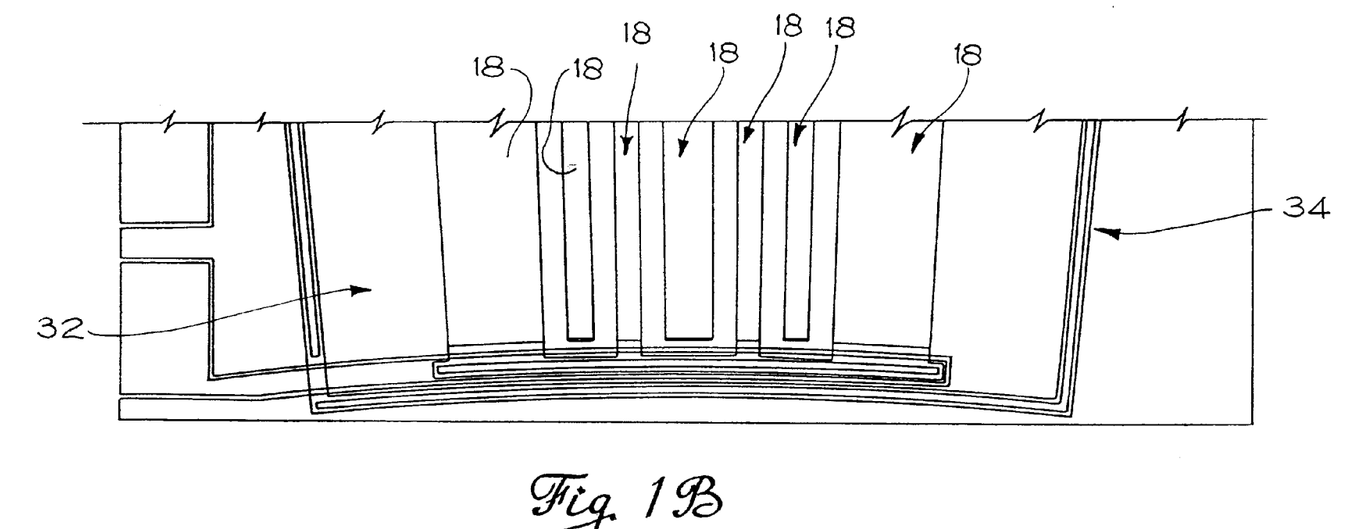
FIG. 1B is a plan view of a second transducing member of the preferred embodiment.

The first transducing member 6 illustrated in FIGS. 1A and 3 provides output signals that correlate to the direction, speed and acceleration of the shaft 10. The first transducing member 6 comprises multiple sets of four optical receivers 20, with each optical receiver 18 having a circumferential width and each set of optical receivers 20 generating at least four distinct electrical signals. Each set of optical receivers 20 is preferably interlaced across a circumferential width greater than or equal to the combined widths of three translucent 14 and three opaque 16 regions of the modulating member 8 shown in FIG. 3. For the purposes of explanation, a first transducing member 6 having a set of optical receivers 20 interlaced across a combined circumferential width of five translucent 14 and five opaque regions 16 will be described. This exemplary arrangement shown in FIG. 2 reduces the adjacent interference and crosstalk that can interfere with the signals generated by a close arrangement of optical receivers 18.

A plurality of contacts 22 are provided radially above and radially below the first transducing member 6. The contacts 22 are segregated into four arcuate tracks 24, 26, 28 and 30 with only selected contacts 22 coupled to certain optical receivers 18 such that each track corresponds to one of four electrical signals. Each of the four tracks 24, 26, 28, and 30 includes open contacts 22 that may be used when optical receivers 18 are added to the first transducing member 6, thereby improving optical resolution.

It should be understood that the illustrated widths are not intended to limit the invention, as the invention may employ optical receivers having other varying or uniform circumferential or linear widths in either the first 6 or the second 32 transducing members.

Figure 4A:
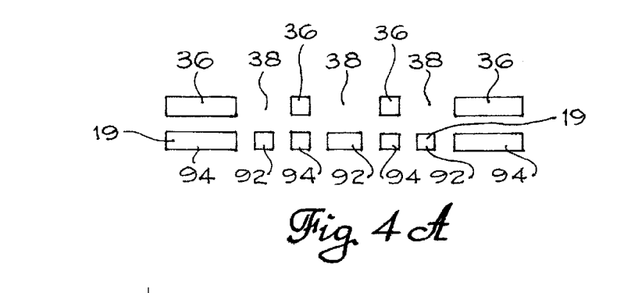
FIG. 4A is a partial schematic view of the code wheel in relation to the second transducing member of the preferred embodiment.

When an index signal is employed, the modulating member 8 also comprises an inner track 34 as shown in FIGS. 3 & 4A. The inner track 34 is substantially translucent having only a small portion of the track blocked by radial extending opaque regions 36 that are separated by radial extending translucent regions 38. Unlike the perimeter track 12, the alternating opaque 36 and translucent regions 38 of the inner track 34 do not extend around the entire inner track 34. Rather, the alternating opaque 36 and translucent regions 38 extend only along a predetermined portion of the inner track 34. As a result, the optical receivers 19 of the second transducing member 32 are often illuminated. This causes the optical receivers 19 to generate large electric currents that are not appreciably affected by noise or light dispersion. In some cases, noise, light dispersion, and/or other interference can cause some optical encoders that do not use a substantially translucent inner track to generate phantom index signals. In these systems, it is sometimes difficult to track the precise position of the shaft 10 as the phantom index signals often do not correspond to a precise angular position of the shaft 10.

If desired, the inner track 34 may be positioned radially inward or outward from the perimeter track 12 or the tracks may be interchanged. In such alternative embodiments, the first 6 and second 32 transducing members would likewise change positions to maintain alignment with either the inner track 34 or the perimeter track 12.

Figure 2:
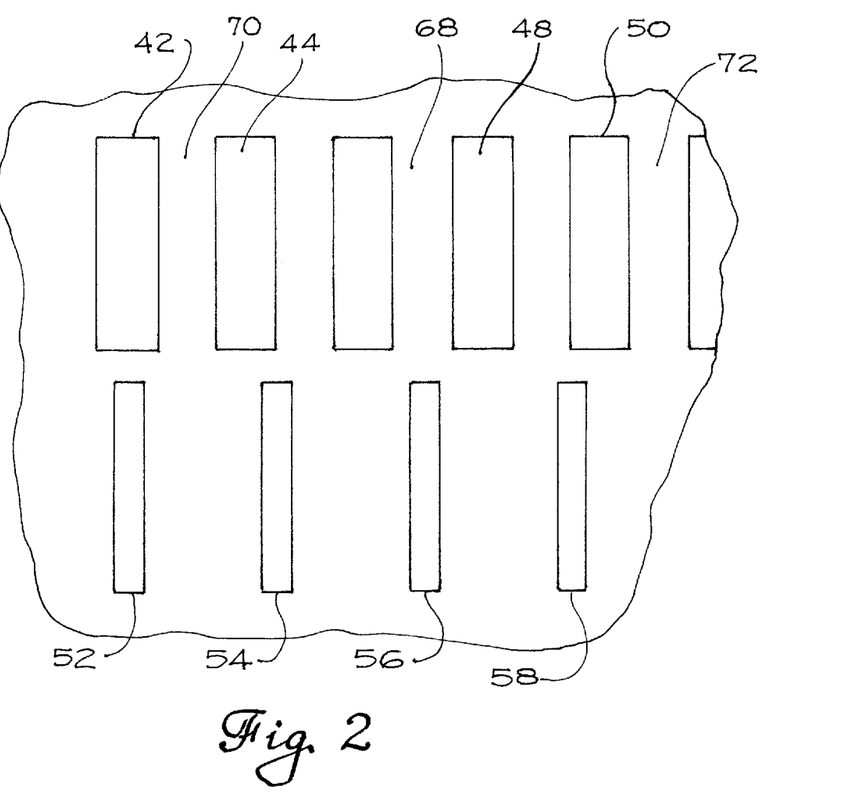
FIG. 2 is a partial schematic view of the code wheel in relation to the first transducing member of the preferred embodiment.
Figure 5:
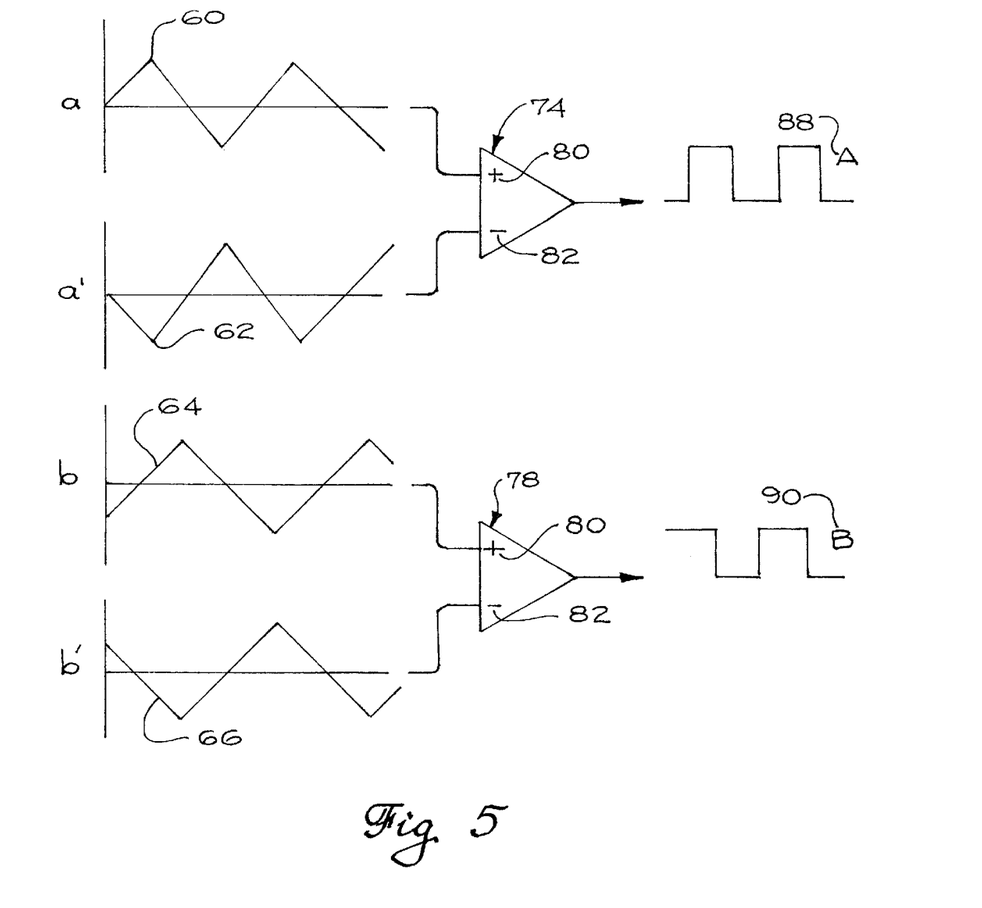
FIG. 5 is a schematic diagram of the conditioning circuitry of the preferred embodiment.

In operation, a rotating device rotates the shaft 10 about an axis 40 as shown in FIG. 3. The rotation of the shaft 10 causes the code wheel 8 to rotate relative to the first transducing member 6 and the light source 4. As the code wheel 8 rotates, light passes through the translucent regions 14 of the code wheel 8 and is received by the optical receivers 18. The optical receivers 18 generate output signals proportional to the light that is incident to the optical receivers 18. As the code wheel 8 rotates, a first translucent region 42 passes between the light source 4 and an a-optical receiver 52, as shown in FIG. 2. This causes the a-optical 52 receiver to produce a maximum electric current, illustrated by a crest 60 of the a-waveform of FIG. 5. While the a-optical receiver 52 is illuminated, an opaque region 68 passes between the light source 4 and an a'-optical receiver 56. This causes the a'-optical receiver 56 to produce a minimum electric current, as shown by a valley 62 of the a'-waveform of FIG. 5. During this time, light passing through the second 44 and the fifth translucent 50 regions partially illuminate the b and the b'-optical receivers 54 and 58, respectively. As shown in FIG. 5, at this point the b-waveform is at a point 64 of increasing amplitude as the b-optical receiver 54 is in transition from a shadow to an illuminating condition. Conversely, the b'-waveform is at a point 66 of decreasing amplitude as the b'-optical receiver 58 is in transition from an illuminated to a shadow condition.

As the code wheel 8 continues to rotate, an opaque region 70 passes partially between the light source 4 and the a-optical receiver 52. This causes the output of the a-optical receiver 52 to decrease in amplitude. As the a-optical receiver 52 output decreases, the passing of the fourth translucent region 48 between the light source 4 and the a'-optical receiver 56 causes the a'-optical receiver 56 output to increase. During this time, the fifth translucent region 50 partially illuminates the b-optical receiver 54 just as an opaque region 72 begins to shadow the b'-optical receiver 58. As a result, the b-optical receiver 54 output increases as the b'-optical receiver 58 output decreases. As shown in FIG. 5, this interchange in amplitude repeats as the code wheel 8 continues to rotate such that the a and a', and b and b'-output waveforms, are two pair of complementary signals that are approximately ninety degrees electrically out of phase. It should be noted that in some designs, the b & b' elements may be reversed to obtain a desired phasing between the signal pairs.

Figure 6:
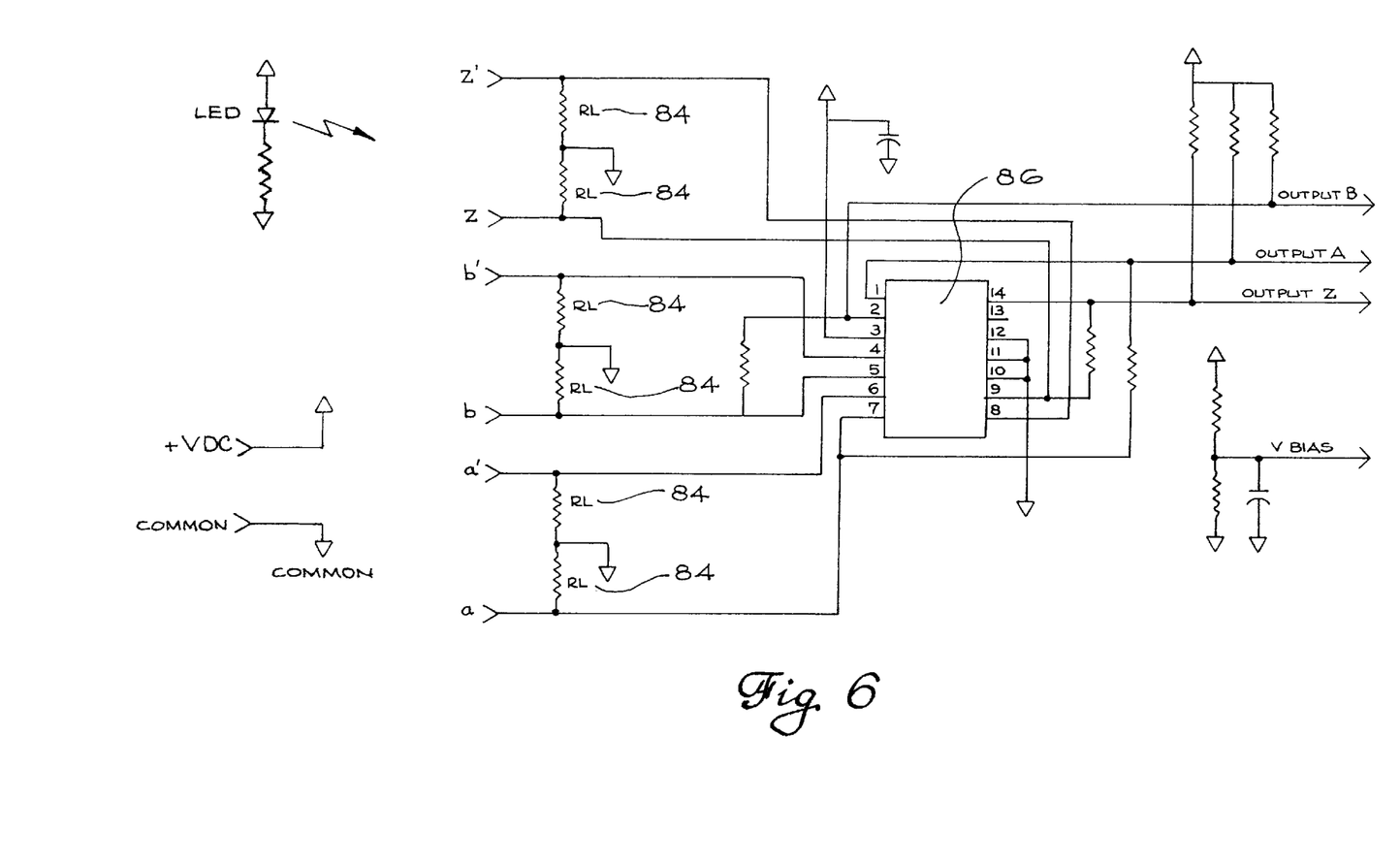
FIG. 6 is a circuit diagram of the circuitry of the preferred embodiment.

The a and a' and b and b' complementary signals are processed by separate comparator circuits 74 and 78. As shown in FIG. 5, the unprimed output signals pass respectively to non-inverting inputs 80 of comparator circuits 74 and 78, while the primed output signals pass respectively to corresponding inverting inputs 82 of the comparator circuits 74 and 78. The sensor load resistors 84 are tied to ground and convert the current output of the sensor to a voltage that can be processed by the comparator. If desired, the input signals may be balanced by load resistors 84 before processing by comparators 74 and 78 integrated on a single chip 86, as shown in FIG. 6. In this arrangement, load resistors 84 can minimize the effect of optical errors by converting the errors to voltage signals that can be virtually eliminated by the common mode rejection characteristics of the comparator. In such an arrangement, the load resistor values may vary according to the condition of the input signals.

Each comparator circuit 74 and 78 compares the unprimed to the primed input to generate an output channel signal. As shown in FIG. 4C, the A and the B output channel signals 88 and 90 are ninety degrees electrically out of phase with one another, forming a quadrature output. It should be noted, that the comparator inputs may be switched between the primed and unprimed signals to achieve desired comparator output phasing.

The quadrature output can be sampled by analog or digital circuitry to determine the angular speed and direction of the shaft 10 Similarly, when an index signal is employed, analog or digital sampling of the index signal may track the angular position of the shaft 10.

When an index signal is employed, the rotation of the code wheel 8 causes the inner track 34 to pass between the light source 4 and the second transducing member 32 comprised of z and z' optical receivers 92 and 94 that are preferably spaced apart by 180 mechanical degrees divided by the disc resolution as measured angularly from the center of the code wheel 8. As the code wheel 8 rotates and the opaque regions 36 shown in FIG. 4A, cause the z' optical receivers 94 to progress to a state of almost no electric current as shown by a declining amplitude 106 of the z' waveform of FIG. 4B. While the z' optical receivers 94 are blocked, the light source 4 illuminates the z optical receivers 92 of FIG. 4A through translucent regions 38 separated by opaque regions 36. This causes the z optical receivers to produce a maximum electric current illustrated by a crest 100 of the z waveform of FIG. 4B.

As the rotation of the shaft 10 shown in FIG. 3 continues, the light source 4 partially illuminates the z' optical receivers 94 through translucent regions 38 as the opaque regions 36 partially block the z' channel optical receivers 94. At this point, the output of the z' optical receivers 94 increase as the output of the z optical receivers 92 decrease. This interchange in amplitude causes a comparator circuit to generate a positive going pulse or index signal as shown in FIG. 4C. This rising edge of the Z channel index signal 96 shown in FIG. 4C occurs when the z' optical electrical current falls to a level that is equal to the z optical electrical current 102 shown in FIG. 4B. Similarly, the falling edge of the Z channel index signal 92 occurs when the z' optical electric current rises to a level that is equal to the z optical electric current 104. Alternatively, the circuit could be designed to generate a negative going Z channel index signal instead of the positive going pulse depicted in FIG. 4C. Although this configuration generates only one index signal per shaft revolution, if desired, several index signals may be generated by adding additional optical receivers 19 to the second transducing member 32 or by adding more opaque regions 36 to the inner track 34 of the modulating member 8.

Figure 4B:
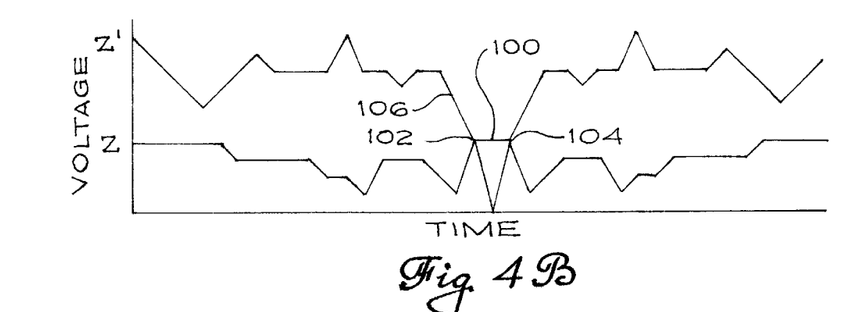
FIG. 4B is a timing diagram of the output signals generated by the optical receivers of the second transducing member of the preferred embodiment.
Figure 4C:
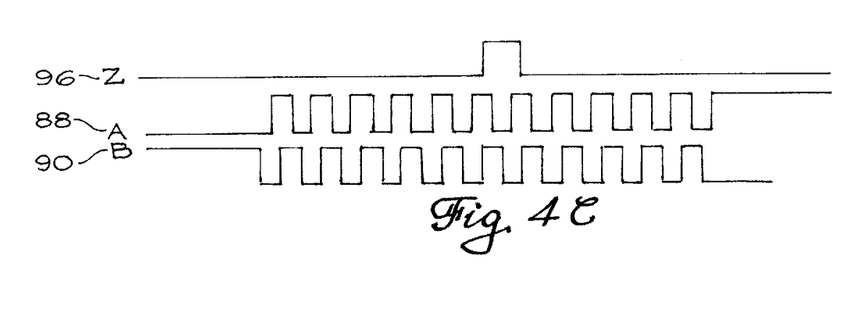
FIG. 4C is a timing diagram of the output channel signals of the first and the second transducing members of the preferred embodiment.

The z' optical receiver 94 has approximately twice the current generating area thus about twice the output of the z optical receiver 92, as shown in FIG. 4B. The interchange of z and z' optical receivers may cause a properly configured comparator to generate either a negative going or positive going pulse or index signal, as shown in FIG. 4B. The width and alignment of the Z channel index pulse is controlled by the modulating member 8 and may be timed to coincide with any mechanical location. In such embodiments, the amplification may vary, and thus, the level of amplification should not be considered a limiting factor of the invention.

Many other embodiments of the invention are also possible. For example, the optical receiver sets 20 (shown in FIG. 1A) of the first transducing member 6 may be positioned across a width slightly larger than three translucent 14 and three opaque regions 16 in any order. In such case, the optical receivers 18 and the transparent and opaque regions 14 and 16 of the code wheel 8 may be densely packed in any order while still maintaining a separation that is significantly free from the effects of crosstalk.

Another alternative embodiment may use a stationary code wheel 8 with the light source 4 and optical receivers 18 coupled to the shaft 10. The light source 4 and optical receivers 18 are positioned so that the light incident to the optical receivers 18 passes through the code wheel 8. Such a configuration isolates the code wheel 8 from the shaft 10 vibration and the forces that accompany shaft rotation.

The foregoing detailed description describes only a few of the many forms that the present invention can take, and should therefore be taken as illustrative rather than limiting. It is only the following claims, including all equivalents that are intended to define the scope of the invention.

What is claimed is:

1. An optical system, comprising:
    a light source that produces a beam of light along an optical path;
    a modulating member having a track including at least a first and a second translucent region, separated by an opaque region, that modulate the light when at least partially in alignment with the optical path, and wherein the first translucent region, the opaque region, and second translucent region each have substantially the same width; and
    a transducing member positioned to receive at least a portion of the light when the light passes through the track the transducing member including a set of four adjacent optical receivers elements spaced across a width greater than or equal to the combined width of three translucent and three opaque regions, the optical receivers being arranged to generate a plurality of output signals.

2. The optical system of claim 1, wherein the modulating member comprises a disc having an outer periphery, and wherein the track is formed near the outer periphery.

3. The optical system of claim 2, further comprising a rotating device arranged to rotate the disc about an axis.

4. The optical system of claim 1, wherein the first and the second translucent regions have substantially the same dimensions.

5. The optical system of claim 1, further comprising a comparator circuit that converts the plurality of output signals into at least one output channel signal.

6. The optical system of claim 1, wherein the optical receiver elements comprise of planar photodiodes.

7. The optical system of claim 6, wherein the planar photodiodes comprise at least one P-N junction.

8. The optical system of claim 1, wherein at least two of said plurality of output signals comprise complimentary output signals.

9. The optical system of claim 1, wherein at least two of said plurality of output signals are phased approximately ninety degrees electrically apart.

10. The optical system of claim 1, further comprising a third and a fourth translucent region that modulate the beam of light when in at least partial alignment with the optical path.

11. An optical system, comprising:
    a light source that produces a beam of light along an optical path;
    a modulating member having a track including at least a first and a second translucent region, separated by an opaque region, that modulate the light when at least partially in alignment with the optical path, and wherein the first translucent region, the opaque region, and second translucent region each have substantially the same width;
    a transducing member positioned to receive at least a portion of the light when the light passes through the track, the transducing member including a set of interlaced optical receivers spaced across a width greater than or equal to the combined width of three translucent and three opaque regions, the optical receivers being arranged to generate a plurality of output signals; and
    wherein the modulating member further includes
        a second track that is substantially translucent, having a substantial portion of the track comprising of a translucent material and having opaque regions that modulate the beam of light when in at least partial alignment with the optical path, and
        a second transducing member positioned to receive a portion of the light when the light passes through the second track, the second transducing member includes optical receivers arranged to generate a second plurality of signals.

12. The optical system of claim 11 wherein the modulating member comprises a disc having an outer periphery, and wherein the first track is formed near the outer periphery and the second track is formed adjacent to the first track.

13. The optical system of claim 11, further comprising a comparator circuit that produces said at least one index signal when at least two of the second plurality of signals are about equal in amplitude.

14. The optical system of claim 11, further comprising a comparator circuit that produces at least one index signal, and wherein said at least one index signal is a positive or negative going pulse.

15. An optical system, comprising:
    a light source that produces a beam of light along an optical path;
    a disc having a track including at least a first and a second translucent region separated by an opaque region that modulate the beam of light when at least partially in alignment with the optical path, and wherein the first and second translucent regions each have substantially the same width as the opaque region; and
    a transducing member positioned to receive at least a portion of the light when the light passes through the track, the transducing member including a set of four adjacent optical receiver elements spaced across a width greater than or equal to the combined width of three translucent and three opaque regions, the optical receivers being arranged to generate a plurality of output signals.

16. The optical system of claim 15, wherein the disc includes an outer periphery, and wherein the track is formed near the outer periphery.

17. The optical system of claim 15, wherein at least two of the plurality of output signals are phased ninety degrees electrically apart.

18. An optical system, comprising:
    a light source that produces a beam of light along an optical path;
    a disc having a track including at least a first and a second translucent region separated by an opaque region that modulate the beam of light when at least partially in alignment with the optical path, and wherein the first and second translucent regions each have substantially the same width as the opaque region; and
    a transducing member positioned to receive at least a portion of the light when the light passes through the track, the transducing member including a set of interlaced optical receivers spaced across a width greater than or equal to the combined width of three translucent and three opaque regions, the optical receivers being arranged to generate a plurality of output signals and are positioned in groups such that each group is spaced across a width of five translucent regions and a width of five opaque regions.

19. An optical system, comprising:
    a light source that produces a beam of light along an optical path;

a disc having a track including at least a first and a second translucent region separated by an opaque region that modulate the beam of light when at least partially in alignment with the optical path, and wherein the first and second translucent regions each have substantially the same width as the opaque region; and a transducing member positioned to receive at least a portion of the light when the light passes through the track, the transducing member including a set of interlaced optical receivers spaced across a width greater than or equal to the combined width of three translucent and three opaque regions, the optical receivers being arranged to generate a plurality of output signals; and wherein the disc further includes
   a second track that is substantially translucent, having a substantial portion of the track comprising of a translucent material and has opaque regions that modulate the beam of light when in at least partial alignment with the optical path, and
   a second transducing member positioned to receive a portion of the light when the light passes through the second track, the second transducing member including optical receivers arranged to generate a second plurality of signals.

20. The optical system of claim 19, further comprising a comparator circuit that produces at least one index signal when at least two of the second plurality of signals are about equal in amplitude.

21. An optical system comprising:
   a light source that produces a beam of light along an optical path;
   a disc having a substantially translucent track having opaque regions that modulate the beam of light when in at least partial alignment with the optical path and wherein a substantial portion of the track comprises a translucent material; and
   a transducing member positioned to receive a portion of the light when the light passes through the track, the transducing member including optical receivers spaced apart by at least 180 mechanical degrees divided by disc resolution measured angularly from a center of the disc and are arranged to generate a plurality of signals.

22. The optical system of claim 21, wherein at least two of the plurality of signals intersect in at least two points.

23. The optical system of claim 21, further comprising a rotating device arranged to rotate the disc about an axis.

24. The optical system of claim 21, further comprising a comparator circuit that converts the plurality of signals into at least one index signal.

* * * * *